United States Patent Office 3,503,810
Patented Mar. 31, 1970

3,503,810
METHOD OF PREPARING AN ANODE COMPOSITION
Irwin J. Groce, Canoga Park, Calif., assignor to North American Rockwell Corporation, a corporation of Delaware
No Drawing. Filed Feb. 13, 1967, Ser. No. 615,351
Int. Cl. H01m *13/04, 13/00*
U.S. Cl. 136—120     12 Claims

ABSTRACT OF THE DISCLOSURE

An anode composition for a solid electrolyte power cell is prepared by blending a compound of silver, preferably $Ag_2O$, with carbon and with a solid electrolyte material. The resulting blend is then heated to reduce the silver compound and give finely divided silver metal powder in a matrix of carbon and electrolyte.

CROSS-REFERENCES TO RELATED APPLICATIONS

Reference is made to the related copending patent applications of the common assignee, Ser. No. 569,193, "Solid Ionic Conductors"; Ser. No. 573,743, "Solid State Electrochemical Devices," now U.S. Patent 3,443,997, and Ser. No. 573,744, "Solid State Cell Construction," filed Aug. 1, 1966, in the names of Gary R. Argue and Boone B. Owens.

BACKGROUND OF THE INVENTION

The present invention relates to a method of preparing an anode composition for a solid electrolyte power cell, and more particularly to such a method wherein metallic silver is produced in finely divided form and in intimate contact with both the electrolyte and an electronic conductor, whereby the silver utilization in the cell is greatly increased.

Solid state cells and the batteries of such cells have been known for several years, as shown in U.S. Patent 2,718,539 and Reissue 24,408. Such cells offer advantages of lightness in weight, long shelf life, absence of electrolyte leakage, attitude independence, and ready miniaturization. Silver halides such as AgI have in the past been principally used for the electrolyte in such cells, and more recently $Ag_3SI$ has been disclosed as a suitable ionic conductor.

Still more recently, solid conductive compositions of matter having unusually high ionic conductivity have been described and claimed in the above-identified copending applications of the common assignee. These applications teach a solid electrolyte element comprising the system MI–AgI wherein the principal conductivity-imparting component is a single-phase solid compound having the formula $MAg_4I_5$ ($MI \cdot 4AgI$), wherein M is selected from the class consisting of K, Rb, $NH_4$, Cs, and combinations thereof, Cs being present only as a minor constituent of M. Electrolyte compositions of the foregoing character may be used in a wide variety of electrical devices, illustrations being solid state electrical timers, coulometers, adaptive computer components, as well as solid state electric cells and batteries. Such electrolyte compositions are generally utilized in cells employing a silver anode and an iodine cathode, an illustration of one such cell being $Ag/RbAg_4I_5/I_2$. The cell may be considered as totally discharged when all the silver has been converted to AgI.

For practical and economic reasons, maximum utilization of potential electrochemical energy, in terms of a cell delivering a total milliampere/hour output approaching the theoretical output, is desirable. As is disclosed in the above-referenced copending application, Ser. No. 573,744, maximum silver utilization is obtained in a composite anode which includes finely divided silver powder intermixed with electrolyte material (ion conductor) and carbon (electron conductor). In such form, silver utilization is greater than as a preformed sheet or film, because the silver is in a form having a markedly increased surface area and is readily available at the silver-electrolyte interface. Thereby, not only is greater current flow possible, but there is also a greater actual utilization of the theoretical energy available from a given amount of silver. Thus, the copending application teaches the use of a composite silver-containing anode. The importance of preparing such an anode composition in a reliable, efficient, and, due to the cost of silver, economical manner, is apparent.

SUMMARY OF THE INVENTION

The principal object of the present invention, therefore, is to provide a method of preparing a composite silver mode for use in a solid state electrolyte cell, whereby maximum silver utilization will be obtained.

Another object is to provide a method of preparing an anode mix of silver, a solid electrolyte material, and a carbon conductor, wherein silver metal is produced in situ from a relatively economical silver compound and is intimately distributed throughout the anode composition in fine particle size.

In accordance with the present invention, a composite anode is made by providing powders of a compound of silver with carbon and a solid electrolyte material, blending together the powders, and then heating the resulting mixture to cause the silver compound to be reduced and thereby give finely divided silver metal powders which are homogeneously distributed in a matrix of carbon and electrolyte.

Through the practice of the present invention, anode compositions yielding 90 percent silver utilization factors are obtained, whereas other methods of forming a composite anode yield silver utilizaton factors of the order of only about 50 percent.

DESCRIPTION OF THE PREFERRED EMBODIMENTS

A silver compound is utilized in the practice of the present invention because such is cheaper than the metal and for other reasons which will appear below. The silver compound is desirably one which will give gaseous reaction products, so as not to leave possibly contaminating ion species and trace impurities in the resulting anode composition. Satisfactory examples are $Ag_2O$, $Ag_2CO_3$, $AgNO_3$, and AgCN, silver oxide being preferred because of its availability, relatively low price, and satisfactory reaction mechanisms.

The selected silver compound powders are blended with a carbon source, for example graphite powder, lamp black, furnace black, and acetylene black. The carbon serves a number of important functions in the reduction process and in the resulting anode composition. Firstly, it is the reductant of the silver compound, reacting with the $Ag_2O$, for example, to form $Ag+CO_2$ (some of the $CO_2$ being converted to CO above red heat temperatures). The carbon powders also function as an electron conductor, providing electrical contact with all electrolyte and silver particles. The carbon additionally serves as a dispersant of the silver metal powders, the fine dispersion of silver powders providing maximum silver surface area for contact with electrolyte particles. Where the silver powders instead fuse into larger agglomerates, poorer silver utilization results. Thus, the carbon particles serve as a dispersant to prevent such agglomeration.

The ratio of the three anode components, silver, electrolyte, and carbon, may satisfactorily vary while giving satisfactory results. There are, however, certain factors to be considered in proportioning the components and in the results thereby obtained. On an overall basis, there should be, by weight, at least 0.2 part of electrolyte and 0.05 carbon part to 1 part of silver. In this composition the ratio of silver is at a practical maximum, high silver concentrations being preferred in order to give high power densities (watt hours/gram or cubic centimeter of anode composition). If the ratio of silver is any higher than about the foregoing, both electron and ionic conductivity will drop as silver powders agglomerate into masses.

The amounts of electrolyte to carbon in the anode compositions bear a relationship and such may vary from a weight ratio of about 2:1 (electrolyte:carbon) to about 20:1. If the ratio is any less than about 2:1, ionic contact drops although electron conductivity is satisfactory, whereas if the ratio is any higher than about 20:1, ionic contact (which is a function of the electrolyte) is satisfactory, but the electron contact (function of carbon) drops. The optimum electrolyte-to-carbon weight ratio is found to be about 4:1. Likewise, the optimum overall ratio of the anode composition is about 1.0 silver +0.3 electrolyte +0.08 carbon. The ratio of electrolyte and carbon to silver may of course increase beyond the foregoing while not impairing operability of a cell nor the utilization of the silver present, but the electrochemical power density will decrease.

The $MAg_4I_5$ electrolyte disclosed in the copending applications and $Ag_3SI$ may be utilized in making an anode composition in the present invention. The $MAg_4I_5$ may be either preformed or formed in situ from its starting materials concurrently with the reduction of the silver compound to silver powders. It is found that forming the electrolyte in situ from its components gives still better uniformity and dispersion of the electrolyte, and therefore is preferred. For example, $RbAg_4I_5$ may be formed by the reaction of stoichiometric quantities of AgI and RbI at a lower temperature than the silver compound decomposition. As an example of the temperatures involved. $RbAg_4I$ is formed from RbI and AgI in a 1:4 ratio at a temperature of about 225° C., whereas $Ag_2O$ begins to decompose in an exothermic reaction at a temperature of about 300° C. Thus, the formation of the $RbAg_4I_5$ is accomplished during the course of heating the anode composition to the necessary temperature for silver reduction.

In addition to utilizing either preformed $MAg_4I_5$ in the reaction mixture or forming such in situ from MI and AgI, the electrolyte may be formed in still another satisfactory manner. In this method AgI, but not MI, is incorporated in the reaction mixture of the silver compound and carbon, and the reduction performed at the usual temperature. At a later time the MI is added to the raw anode composition (Ag+AgI+C) and $MAg_4I_5$ formed at the customary lower temperature for such formation, e.g., 225° C. The attraction of this technique is twofold. Firstly, where the final anode composition, which is subject to some hydrolysis with water vapor, is to be stored for a period of time prior to use, storage may be more conveniently accomplished and shelf life extended.

Secondly, other suitable electrolyte compositions which might be used in the anode composition are less stable at the elevated temperature (e.g., 450° C.) of the silver compound reduction. Such compositions may be used by first adding the AgI to the initial reaction mixture as previously. After the elevated temperature reduction, the electrolyte material is added and reacted with the AgI at a suitable lower temperautre. For example, various organic ammonium iodides have been shown by a coworker to be satisfactory electrolyte materials suitable for use in anode compositions of the present character. Examples are the quaternary ammonium iodides such as tetraethyl-, tetramethyl-, ethylmethyl-, and alkyl-ammonium iodides. and also cyclic ammonium iodides such as pyridinium iodide. The organic ammonium iodide will react with the AgI at a relatively modest temperature to form ion conductive organic iodides. For example, tetraethyl ammonium iodide, one of the preferred compounds, will react with AgI at a temperature in the range of about 200–240° C. to form $(C_2H_5)_4NAg_6I_7$.

Since the silver reduction, once reaction temperature is reached, occurs very rapidly and exothermally, care must be exercised lest the heat generated cause the silver powders to consolidate, thereby reducing their surface area and utilization factors. This phenomenon may be prevented or reduced by reacting the silver compound with a given charge of electrolyte and carbon in at least two separate steps. Thus, a given portion of the total silver concentration is first reacted with the electrolyte and carbon mixture and then the remaining amount of silver is reacted with the resulting silver metal-electrolyte-carbon mixture. For example, to obtain an anode composition having the weight ratio 1.0 Ag+0.3 electrolyte+0.08 carbon, one might react 215 grams $Ag_2O$, 12 grams RbI, 48 grams AgI, and 20 grams carbon. The $Ag_2O$ is divided into two portions of 107.5 grams, the first portion blended with the electrolyte and carbon powders, and the mixture heated to reaction temperature. After the first reaction is complete, the second 107.5 grams $Ag_2O$ is added to the reaction mixture and the reaction step repeated. The silver may be satisfactorily divided in other proportions and the number of reactions may also vary.

As previously mentioned, the reaction begins to occur at a temperature of about 300° C. (for $Ag_2O$). However, it is preferred to employ a temperature which will give a more complete and rapid reaction, for example about 400–475° C., depending upon the particular silver compound employed. A temperature of about 450° C. is preferred for $Ag_2O$ reduction with the carbon. Initiation of the reduction temperature is evidenced by a sharp increase of pressure from the gaseous reaction product (e.g., $CO_2$), and the reaction is considered complete when there is no further pressure buildup. The reaction is preferably but not necessarily conducted in a non-oxidizing atmosphere, for example, in an inert gas atmosphere such as argon. A small amount of carbon would be consumed by reaction with any oxygen which is present. After the reaction is complete, the reaction retort is cooled, for example by lowering it into a container of water.

The copending applications disclose that small, compact power cells may be made in the form of multilayer pellets. To facilitate pellet formation of the anode composition, certain post-reduction treatments may be performed to convert the powders into more readily manageable granules. Thus, an $MAg_4I_5$-containing composition is densified at elevated pressures (for example about 3–10 tons per sq. in.) followed by annealing in air for about 15–25 minutes at a temperature of about 350–425° C. When the resulting compact is cooled it is then broken and crushed to give a random distribution of desired particle sizes, suitable for use in a pelletizing apparatus. This post-reduction compaction, anneal, and grinding gives a product of better uniformity, grain size, and quality.

For organic ammonium iodides annealing temperatures above above 250° C. cannot be used lest the compound decompose. With such compositions densification for pelletizing purposes may be accomplished concurrently with the compound formation previously described. Thus, with an organic ammonium iodide, such as $(C_2H_5)_4NI$ when the raw anode composition of Ag+AgI+C is reacted to form the silver heptaiodide $(C_2H_5)_4NAg_6I_7$, pressure (½–3 tons/sq. in.) may be concurrently applied to the reaction mixture.

The following examples are offered to illustrate the present invention in greater detail.

EXAMPLE I

Chemically pure $Ag_2O$ powder, 21.5 grams, was blended by means of a spatula with 22.6 grams of AgI powder, 7.4 grams of RbI crystals and 7.5 grams of carbon (acetylene black) in a glass beaker. The mixture was further mixed and pulverized by feeding it twice through a disc pulverizer, following which it was placed in a 3-in. diameter stainless steel retort. The retort was evacuated, backfilled with argon, and heated to 450° C. in an electrically heated furnace.

Initiation of the reduction reaction was evidenced by a rapid increase in the pressure inside the retort after about 10 minutes. The retort was then cooled by lowering it into a container of water. This completed the first half of the reduction.

The reaction product was removed from the retort and blended with a second charge of 32.3 grams of $Ag_2O$ and again pulverized through the disc pulverizer. This mixture was next placed into the retort and heated to 450° C. after evacuating and filling the retort with argon. The second reduction was also evidenced by a rapid increase in pressure inside the retort but required about 15 minutes to initiate. The retort was cooled in the same manner as above and the product removed. This completed the reduction, yielding 84 grams (98 percent recovery) of product with a nominal weight composition of 1.0 Ag+0.6 $RbAg_4I_5$+0.15 C.

The foregoing anode composition was then compacted at 5 tons/sq. in. and heated in an open beaker for about 20 minutes at 400° C. When the compact was cooled it was broken and crushed in a mortar and pestle to give a random distribution of particle sizes up to about 10 mesh. Although no sieve analysis was made, very little fine powder (−200 mesh) was observed.

Test cells fabricated from this batch, having the representation $Ag/RbAg_4I_5/I_2$+C, averaged 109 milliampere-hours (20 ma. current drain) out of a theoretically available 125 milliampere-hours. This comprised a utilization of 88 percent of the silver from an anode containing 59 percent Ag.

EXAMPLE II

The procedures utilized for blending and pulverizing were the same as in Example I except that the batch size was increased and the ratios changed as follows:

| | Grams |
|---|---|
| $Ag_2O$ | 107.5 |
| AgI | 48.0 |
| RbI | 15.0 |
| Carbon | 20.0 |

After pulverizing these in the disc pulverizer, the material was added to the reduction retort.

The second reduction was prepared by combining the lots from the first reduction with 107.5 grams of $Ag_2O$, and blending and pulverizing in the disc pulverizer. The final product was again compacted into pellets at 5 tons/sq. in. and heated for 20 minutes at 400° C. Product yield was over 90 percent.

The cooled and crushed product was tested in 125 milliampere-hour cells, giving an average of 116 milliampere-hours or 93 percent silver utilization in an anode blend of 1.0 Ag+0.3 electrolyte+0.08 C which contained 72.5 percent silver.

EXAMPLE III

The procedures of Example I were followed except that a raw anode batch was made in which 53.7 grams powdered $Ag_2O$, 27 grams powdered AgI and 10 grams acetylene black were blended together, pulverized and charged to the 3-in. diameter reduction retort. The reduction reaction was initiated by heating to 450° C. The product from the first reduction was blended with an additional 53.7 grams of $Ag_2O$ and pulverized again and the second reduction was completed by heating to 450° C. again in the reduction retort.

A 13.3-gram portion of the resulting raw anode composition was blended with 0.8 gram of RbI and pulverized. The material was then placed in a die and compressed at 4000 pounds/sq. in. and heated to 220° C. while in the die under pressure. The resultant pellet was hard and dense and was crushed into granules suitable for pelletizing feed. A cell from this anode gave 87 percent silver utilization.

EXAMPLE IV

The procedure of Example III was followed in preparing the raw anode composition. A 13.3-gram portion of this raw anode composition was blended with 0.5 gram of tetraethyl ammonium iodide and pulverized. The blend was heated to 220° C. in a die under 2000 p.s.i. pressure for one minute. The resulting pellet was crushed and a cell was made in which the silver utilization was 76 percent.

It should be observed that the foregoing examples are illustrative rather than restrictive of the full scope of the present invention. This invention, therefore, should be understood to be limited only as is indicated by the appended claims.

What is claimed is:

1. A method of preparing an anode composition for a solid state electrolyte power cell which comprises
   (a) blending together a silver compound decomposable into silver metal and a gaseous reaction product; carbon; and an ionically conductive solid electrolyte composition containing silver ions for conduction of current; and
   (b) heating the resulting mixture at an elevated temperature sufficient to reduce said silver compound, thereby yielding at least a ternary intimate mixture of powders of silver metal, said silver-containing solid electrolyte, and carbon.

2. The method of claim 1 wherein the silver compound is selected from the class consisting of $Ag_2O$, $Ag_2CO_3$, $AgNO_3$, and AgCN.

3. The method of claim 1 wherein the electrolyte composition is $MAg_4I_5$, wherein M is selected from the class consisting of K, Rb, $NH_4$, Cs, and combinations thereof, Cs being present only as a minor constituent of M.

4. The method of claim 1 wherein the electrolyte comprises its component constituents MI and AgI, wherein M is selected from the class consisting of K, Rb, and $NH_4$, Cs, and combinations thereof, Cs being present as only a minor constituent of M, said MI and AgI reacting to form $MAg_4I_5$ in situ.

5. The method of claim 1 wherein the electrolyte composition initially comprises its constituent AgI and wherein, following the reduction step of 1(b) which yields the raw anode composition Ag, AgI, and C, a second electrolyte constituent selected from the class consisting of
   (a) MI, wherein M is selected from the class consisting of K, Rb, $NH_4$, Cs, and combinations thereof, Cs being present as only a minor constituent of M, and
   (b) an organic ammonium iodide selected from the class consisting of quaternary ammonium iodides and cyclic ammonium iodides,
is added to said raw anode composition, thoroughly mixed therewith, and the resulting mixture heated to a temperature of about 200–250° C. thereby yeilding a final anode composition of silver powder intimately mixed with carbon and the electrolyte composition.

6. The method of claim 1 wherein said silver compound is reacted with the carbon and electrolyte mixture in a plurality of steps, each step comprising
   (a) reacting a portion of the silver compound charge of 1(a) with said carbon and electrolyte, followed by
   (b) adding an additional portion of said silver charge to the resulting reaction mixture and repeating the reduction step of 1(b) to thereby yield a mixture of fine, unagglomerated silver powders in a matrix of carbon and electrolyte.

7. A method of forming an anode composition for a solid state electrolyte power cell, which comprises
   (a) mixing together powders of a silver compound selected from the class consisting of $Ag_2O$, $Ag_2CO_3$, $AgNO_3$, and $AgCN$ with
   (b) electrolyte constituents $AgI$ and $MI$, wherein M is selected from the class consisting of Rb, K, $NH_4$, Cs, and combinations thereof, wherein Cs is only a minor constituent of M, and
   (c) heating the resulting mixture at a temperature of about 400–475° C., and thereby yield a fine dispersion of silver in a matrix of carbon and $MAg_4I_5$ particles.

8. The method of claim 7 wherein the silver charge of 7(a) is divided into two parts, the first part being reacted in said mixture of carbon and electrolyte constituents, then mixing the second part of said charge with the reaction product mixture of 7(c), and heating the resulting mixtures at a temperature of about 400–475° C., in order to reduce the remaining portion of said silver charge to silver powder.

9. A method of forming an anode composition for a solid state electrolyte power cell which comprises
   (a) mixing together powders of a silver compound selected from the class consisting of $Ag_2O$, $AgNO_3$, $Ag_2CO_3$, and $AgCN$, with carbon and $AgI$,
   (b) heating the resulting mixture in a nonoxidizing atmosphere at a temperature of about 400–475° C., thereby reducing the silver compound to silver metal,
   (c) adding to the resulting reaction product an electrolyte constituent selected from the class consisting of
      (i) MI, wherein M is selected from the class consisting of Rb, K, $NH_4$, and Cs, and combinations thereof, Cs being a minor constituent of M, and
      (ii) an organic ammonium iodide selected from the class consisting of quaternary ammonium iodides and cyclic ammonium iodides, and
   (d) then heating the resulting mixture in a non-oxidizing atmosphere at a temperature of about 200–250° C., thereby forming the electrolyte constituent of the anode composition in a finely divided mixture with Ag and C.

10. The method of claim 9 wherein the silver compound is $Ag_2O$ and the electrolyte constituent is MI.

11. A method of forming an anode composition for a solid state electrolyte power cell, which comprises
   (a) mixing together powders of $Ag_2O$, carbon, $AgI$, and MI, wherein M is selected from the class consisting of Rb, K, $NH_4$, Cs, and combinations thereof, Cs being a minor constituent of M, and wherein the weight ratios of the composition are at least about 0.2 ($AgI+MI$) and 0.05 C to 1.0 $Ag_2O$, and
   (b) heating the resulting mixture at a temperature of about 400–475° C. in a rare gas atmosphere, thereby forming an intimate mixture of powders of carbon, silver metal, and $MAg_4I_5$.

12. The method of claim 11 wherein the resulting powder mixture of Ag, $MAg_4I_5$, and C is then densified at a pressure of about 4–10 tons per sq. in., and sintered at a temperature of about 400–475° C.

References Cited

UNITED STATES PATENTS

| | | | |
|---|---|---|---|
| 937,387 | 10/1909 | Reid | 75—83 XR |
| 2,418,812 | 4/1947 | Girvin | 75—0.5 |
| 2,658,827 | 11/1953 | Patron | 75—83 XR |
| 2,905,740 | 9/1959 | Smyth et al. | 136—83 |
| 3,160,527 | 12/1964 | Hess | 136—86 |
| 3,170,817 | 2/1965 | Mrgudich | 136—83 |
| 3,268,365 | 8/1966 | McQuade et al. | 136—120 XR |
| 3,379,569 | 4/1968 | Berger et al. | 136—6 |
| 3,395,049 | 7/1968 | Thompson | 136—122 |

FOREIGN PATENTS 735,831  6/1966  Canada.

ALLEN B. CURTIS, Primary Examiner

A. SKAPARS, Assistant Examiner

U.S. Cl. X.R.

75—0.5; 136—83, 122, 153; 252—502; 264—105